(12) United States Patent
Kawashita et al.

(10) Patent No.: US 9,237,061 B2
(45) Date of Patent: Jan. 12, 2016

(54) TRANSMISSION APPARATUS AND TRANSMISSION METHOD

(75) Inventors: Mitsuya Kawashita, Osaka (JP); Dai Suzuki, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 43 days.

(21) Appl. No.: 13/560,334

(22) Filed: Jul. 27, 2012

(65) Prior Publication Data
US 2013/0064113 A1    Mar. 14, 2013

(30) Foreign Application Priority Data

Sep. 12, 2011 (JP) ................................. 2011-198468

(51) Int. Cl.
*H04L 12/26* (2006.01)
*H04L 12/28* (2006.01)
*H04L 12/24* (2006.01)
H04L 12/823 (2013.01)

(52) U.S. Cl.
CPC ................. *H04L 41/00* (2013.01); *H04L 43/10* (2013.01); *H04L 47/323* (2013.01)

(58) Field of Classification Search
CPC .... H04Q 11/0478; H04L 47/50; H04L 41/00; H04L 43/10; H04L 47/323
USPC ...................... 370/252–256; 711/154; 710/52
See application file for complete search history.

(56) References Cited

U.S. PATENT DOCUMENTS

| | | | |
|---|---|---|---|
| 6,393,532 B1 * | 5/2002 | Takada et al. ................. | 711/154 |
| 7,043,541 B1 * | 5/2006 | Bechtolsheim et al. ...... | 709/223 |
| 7,593,399 B2 * | 9/2009 | Nishihara ..................... | 370/389 |
| 7,630,409 B2 * | 12/2009 | Goel et al. .................... | 370/516 |
| 2002/0006111 A1 * | 1/2002 | Akita et al. .................... | 370/235 |
| 2003/0067879 A1 * | 4/2003 | Masunaga et al. ............ | 370/235 |
| 2003/0091045 A1 * | 5/2003 | Choi et al. ..................... | 370/390 |
| 2004/0085905 A1 * | 5/2004 | Lim et al. .................. | 370/236.2 |
| 2004/0208631 A1 * | 10/2004 | Song et al. .................... | 398/168 |
| 2005/0055436 A1 * | 3/2005 | Yamada et al. ............... | 709/224 |
| 2005/0163132 A1 * | 7/2005 | Mieno et al. ............ | 370/395.53 |

(Continued)

FOREIGN PATENT DOCUMENTS

| | | |
|---|---|---|
| JP | 8-237254 | 9/1996 |
| JP | 9-69833 | 3/1997 |

(Continued)

OTHER PUBLICATIONS

Office Action mailed Mar. 17, 2015 for corresponding Japanese Patent Application No. 2011-198468 (3 pages) (2 pages English Translation).

(Continued)

*Primary Examiner* — Khaled Kassim
*Assistant Examiner* — Berhanu Belete
(74) *Attorney, Agent, or Firm* — Staas & Halsey LLP

(57) ABSTRACT

A transmission apparatus includes a digital circuit that has an input circuit into which packets are input at indefinite intervals; a measuring circuit that measures an interval during which no packet is input into the input circuit; a determiner circuit that determines, based on the interval measured by the measuring circuit, whether to insert a given frame between packets input into the input circuit; and a transmitter that inserts, based on a result of determination by the determiner circuit, the given frame between the packets input into the input circuit and sequentially transmits the packets with the given frame therebetween.

5 Claims, 13 Drawing Sheets

(56) References Cited

U.S. PATENT DOCUMENTS

| | | |
|---|---|---|
| 2005/0169182 A1* | 8/2005 | Klink .......................... 370/236.2 |
| 2006/0209683 A1* | 9/2006 | Nishimura .................... 370/222 |
| 2007/0165658 A1* | 7/2007 | Mutoh .......................... 370/403 |
| 2008/0304488 A1* | 12/2008 | Naito et al. ................... 370/394 |
| 2009/0028156 A1* | 1/2009 | Kikugawa .................... 370/394 |
| 2009/0040956 A1* | 2/2009 | Shinoi ........................... 370/312 |
| 2009/0143020 A1* | 6/2009 | Kotabe et al. .............. 455/67.11 |
| 2009/0310508 A1* | 12/2009 | Ou et al. ....................... 370/253 |
| 2010/0011133 A1* | 1/2010 | Takano .......................... 710/10 |
| 2010/0318870 A1* | 12/2010 | Utagawa ....................... 714/748 |
| 2011/0188380 A1* | 8/2011 | Song et al. ................. 370/241.1 |

FOREIGN PATENT DOCUMENTS

| | | |
|---|---|---|
| JP | 2000-224175 | 8/2000 |
| JP | 2010-16654 | 1/2010 |

OTHER PUBLICATIONS

Office Action mailed Jul. 21, 2015 for corresponding Japanese Patent Application No. 2011-198468 (2 pages) (1 page English Translation).

* cited by examiner

TRANSMISSION APPARATUS AND TRANSMISSION METHOD

CROSS REFERENCE TO RELATED APPLICATIONS

This application is based upon and claims the benefit of priority of the prior Japanese Patent Application No. 2011-198468, filed on Sep. 12, 2011, the entire contents of which are incorporated herein by reference.

FIELD

The embodiments discussed herein are related to a transmission apparatus and a transmission method for transmitting data.

BACKGROUND

Following the recent development of Internet Protocol (IP) networks, Ethernet (registered trademark) has been suggested to replace services that have been provided over a dedicated line (for example, inter-enterprise communication). However, unlike a dedicated line, Ethernet is based on a different concept and thus has no scheme to ensure high-quality communication.

This has not been a problem in conventional IP networks since the networks are mainly used for data communication. On the other hand, fluctuation (variation in transmission delay) does not occur in optical transport networks (OTNs) such as synchronous digital hierarchy (SDH) since the communication speed is based on n times the 64 Kbps for audio. As SDH is being replaced with Ethernet, implementation of dedicated line networks on Ethernet has come under consideration.

Thus, in the development of a means for replacing a transmission apparatus on a dedicated line requiring high-quality communication, it becomes a problem that fluctuation occurs in a long-haul transmission using Ethernet packets when the packets pass through multiple ring networks. For example, fluctuation occurs when the packet interval, which is constant at the transmission side, increases/decreases during transmission due to arbitration of signals from other systems. In audio communication such as Voice over IP (VoIP), for example, fluctuation becomes audio distortion.

For example, although Ethernet prioritizes the signals from the other systems and transmits packets of a high priority first, among packets that have arrived at the same time, fluctuation still occurs if the priority is the same. Further, a transmission apparatus of Ethernet has a function of operation administration maintenance (OAM), and regularly transmits OAM frames for inspection at the rate of, for example, 300 frames/second according to the ITU recommendation. These OAM frames that are regularly transmitted and inserted between packets are also one cause of fluctuation.

Fluctuation cannot be suppressed by prioritization since the OAM frames have a high priority and are more likely to be inserted between packets than other packets. Further, since stations through which the packets pass insert the OAM frames for respective purposes, the number of inserted OAM frames increases as the number of the stations increases, thereby increasing the fluctuation.

In SDH and asynchronous transfer mode (ATM), technology is known that minimizes delay of packets due to insertion of OAM frame (see, for example, Japanese Laid-Open Patent Publication Nos. H08-237254 and 2000-224175). In this technology, a null packet (null cell) that has a fixed length and is transmitted during an interval between packets is detected based on the header of each frame, and the OAM frame is inserted between the detected null packets.

However, the intervals between packets are indefinite in a communication network such as Ethernet where no null packet is transmitted during the intervals between packets. Thus, according to the conventional technology described above, the data length of a frame inserted between packets may be longer than the interval between packets. In this case, it becomes a problem that packets subsequent to the inserted frame are delayed, thereby increasing variation (fluctuation) in transmission delay.

SUMMARY

According to an aspect of an embodiment, a transmission apparatus includes a digital circuit that has an input circuit into which packets are input at indefinite intervals; a measuring circuit that measures an interval during which no packet is input into the input circuit; a determiner circuit that determines, based on the interval measured by the measuring circuit, whether to insert a given frame between packets input into the input circuit; and a transmitter that inserts, based on a result of determination by the determiner circuit, the given frame between the packets input into the input circuit and sequentially transmits the packets with the given frame therebetween.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

Preferred embodiments of a transmission apparatus and a transmission method according to the present invention are described in detail below with reference to the accompanying drawings.

Figure 1:
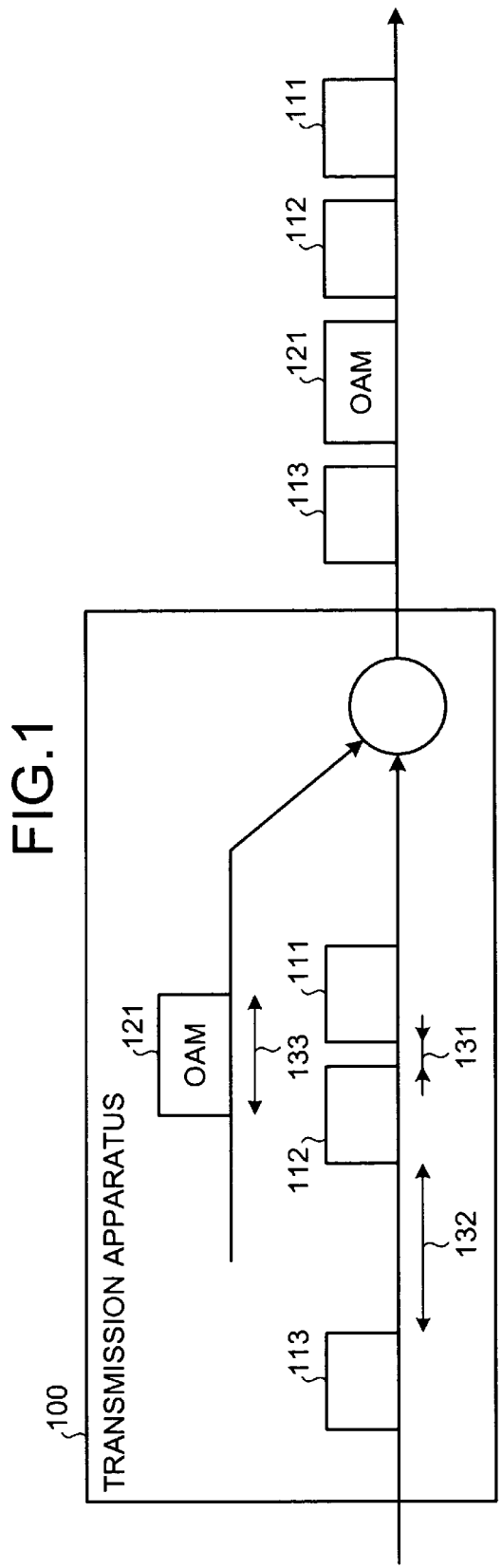
FIG. 1 is a schematic of an example of insertion of an OAM frame by a transmission apparatus according to an embodiment.

FIG. 1 is a schematic of an example of insertion of an OAM frame by a transmission apparatus according to an embodiment. As depicted in FIG. 1, packets 111 to 113 are input, at indefinite intervals, into a transmission apparatus 100 according to the embodiment. For example, the transmission apparatus 100 is a transmission apparatus of a communication network such as Ethernet in which packets of variable length are transmitted at indefinite intervals. For example, the packets 111 to 113 are data requiring real-time transmission such as audio data of VoIP and video data for video phone.

The transmission apparatus 100 transmits the input packets 111 to 113 sequentially to other communication apparatuses according to, for example, first in first out (FIFO) where packets are transmitted in the order in which the packets are input.

The transmission apparatus 100 inserts and transmits an OAM frame 121 (a given frame) into an interval during which none of the packets 111 to 113 are input. For example, the transmission apparatus 100 measures the interval such as an interval 131 between packets 111 and 112 and an interval 132 between packets 112 and 113, and determines whether to insert the OAM frame 121 between the input packets based on the measured interval.

For example, the transmission apparatus 100 determines not to insert the OAM frame 121 between the packets 111 and 112 since the interval 131 therebetween is shorter than a data length 133 of the OAM frame 121. Thus, variation in transmission delay of the packet 112 due to the insertion of the OAM frame 121 can be suppressed.

On the other hand, the transmission apparatus 100 determines to insert the OAM frame 121 between the packets 112 and 113 since the interval 132 therebetween is longer than the data length 133 of the OAM frame 121. Thus, the OAM frame 121 can be transmitted while suppressing the variation in the transmission delay of the packet 112.

In this case, the transmission apparatus 100 transmits the packet 111, the packet 112, the OAM frame 121, and the packet 113 in this order. The intervals between the packets 111 to 113 are not changed from the time of input. Thus, the variation in the transmission delay of the packets 111 to 113 due to the insertion of the OAM frame 121 can be suppressed, thereby enabling the packets 111 to 113 to be transmitted in real time. Thus, for example, audio distortion occurring at the receiver side of the packets 111 to 113 can be suppressed if the packets 111 to 113 are audio data.

Figure 2:
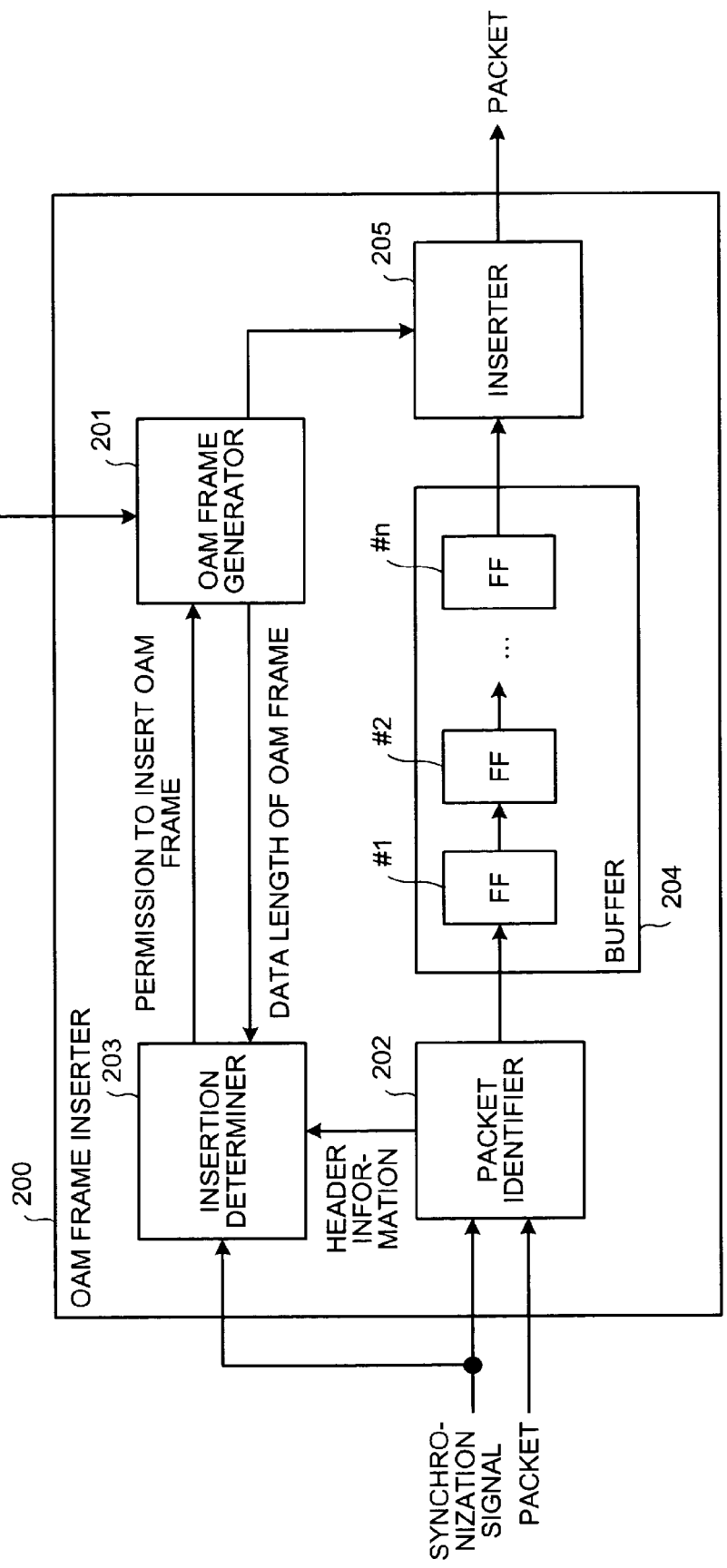
FIG. 2 is a schematic of an example of an OAM frame inserter included in the transmission apparatus.

FIG. 2 is a schematic of an example of an OAM frame inserter 200 included in the transmission apparatus 100 depicted in FIG. 1. Packets input into the transmission apparatus 100 at 1 Gbps, for example, and a synchronization signal indicating the operation timing of the transmission apparatus 100 are input into the OAM frame inserter 200 that inserts the OAM frame into the interval during which no packet is input.

For example, the OAM frame inserter 200 includes an OAM frame generator 201, a packet identifier 202, an insertion determiner 203, a buffer 204, and an inserter 205. The OAM frame generator 201 can be implemented by a digital circuit such as a central processing unit (CPU). The packet identifier 202, the insertion determiner 203, the buffer 204, and the inserter 205 are implemented by a digital circuit such as a field programmable gate array (FPGA).

The OAM frame generator 201 generates and regularly transmits the OAM frame. For example, the OAM frame generator 201 transmits a given number or more of OAM frames per unit time (for example, 300 frames per second). The OAM frame generator 201 generates and transmits the OAM frame under the control of a control device of the transmission apparatus 100 (see FIG. 9, for example).

The OAM frame generator 201 notifies, when transmitting the generated OAM frame, the insertion determiner 203 of the data length of the OAM frame to be transmitted and outputs the generated OAM frame to the inserter 205 if notified by the insertion determiner 203 of a permission to insert the OAM frame. The timing at which the OAM frame generator 201 outputs the OAM frame is described later.

The packet identifier 202 is an input circuit into which packets are input at indefinite intervals. For example, the packet identifier 202 operates in synchronization with the synchronization signal input into the OAM frame inserter 200. The packet identifier 202 acquires header information (header) at the head of the packet input into the transmission apparatus 100, and outputs the acquired header information to the insertion determiner 203. The packet identifier 202 also outputs the packet input into the OAM frame inserter 200 to the buffer 204.

The insertion determiner 203 is a measuring circuit that measures the interval during which no packet is input into the packet identifier 202. The insertion determiner 203 is also a determiner circuit that determines whether to insert the OAM frame (a given frame) between packets input into the packet identifier 202 based on the measured interval.

For example, the insertion determiner 203 determines whether to insert the OAM frame into the interval between packets based on the data length of the OAM frame notified by the OAM frame generator 201 and the header information output from the packet identifier 202. For example, the insertion determiner 203 measures the interval between packets based on the header information, compares the measured interval and the data length of the OAM frame, and determines whether to insert the OAM frame based on the comparison result. Upon that determining the OAM frame is to be inserted, the insertion determiner 203 notifies the OAM frame generator 201 of permission to insert the OAM frame.

The buffer 204 temporarily stores the packet output from the packet identifier 202, and sequentially outputs the stored packet to the inserter 205. For example, the buffer 204 includes n flip flop (FF) circuits #1 to #n connected in series that temporarily store the input bit data and sequentially output the stored bit data downstream. The FF circuits #1 to #n operate in synchronization with the synchronization signal input into the OAM frame inserter 200. The data length of data stored in the buffer 204 is, for example, the maximum data length of the packet input into the OAM frame inserter 200.

The inserter 205 sequentially transmits the packets input into the packet identifier 202, and inserts and transmits the OAM frame between packets based on the determination result obtained by the insertion determiner 203. For example, the inserter 205 outputs the packets output from the buffer 204 and the OAM frame output from the OAM frame generator 201, thereby outputting the packets input into the OAM frame inserter 200 with the OAM frame being inserted into the intervals between the packets. The packets and the OAM frame output from the inserter 205 are transmitted to an external communication apparatus.

The timing at which the OAM frame generator 201 outputs the OAM frame is described next. For example, if notified by the insertion determiner 203 of a permission to insert the OAM frame, the OAM frame generator 201 calculates a time by subtracting the data length of the OAM frame notified to the insertion determiner 203 from the data length of the data stored in the buffer 204, thereby calculating the data length of data remaining in the buffer 204. The OAM frame generator 201 outputs the OAM frame to the inserter 205 after the time required for data of the calculated data length to be output from the buffer 204 has elapsed, thereby inserting the OAM frame into the interval between packets.

Thus, when inserting the OAM frame, the OAM frame inserter 200 monitors the interval between input packets and defers the insertion of the OAM frame if the insertion affects other packet(s). Alternatively, the OAM frame can be inserted earlier than a specified timing at which the OAM frame is to be inserted, by notifying the data length of the OAM frame from the OAM frame generator 201 to the insertion determiner 203 before the specified timing.

Figure 3:
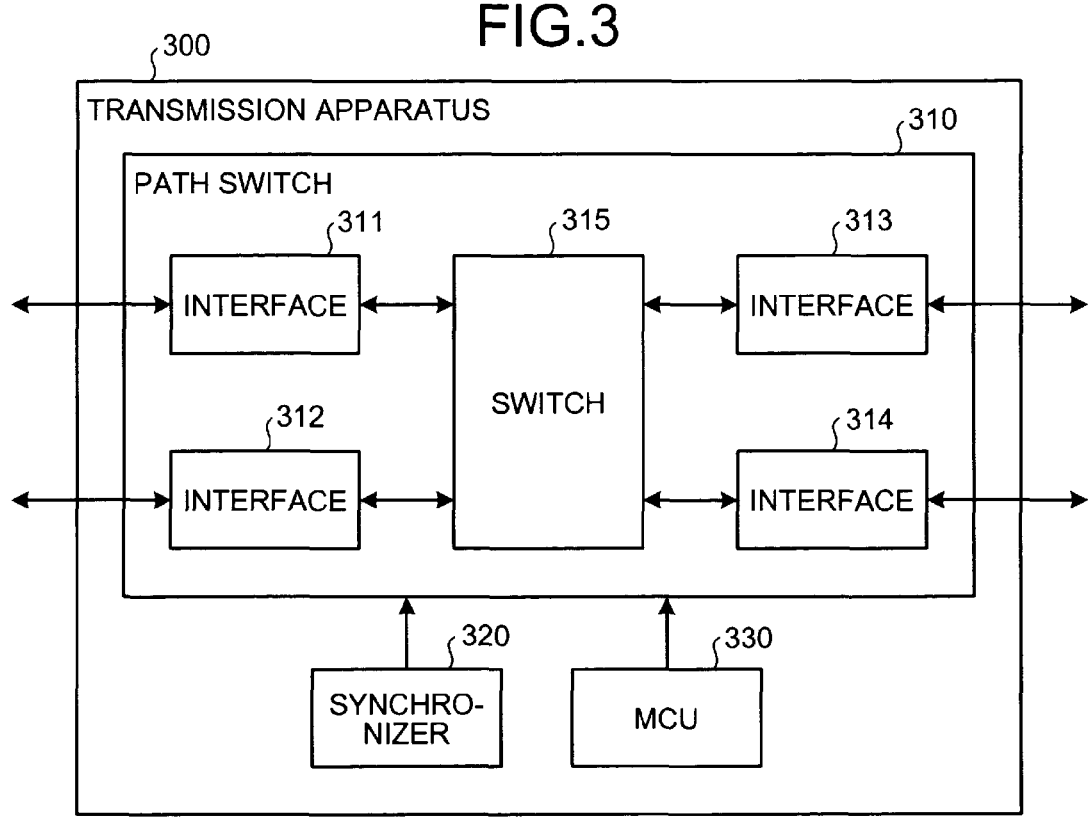
FIG. 3 is a schematic of an example of the transmission apparatus.

FIG. 3 is a schematic of an example of a transmission apparatus 300 that is an example of the transmission apparatus 100 depicted in FIG. 1. As depicted in FIG. 3, the transmission apparatus 300 includes a path switch 310, a synchronizer 320, and a micro controller unit (MCU) 330. The path switch 310 includes interfaces 311 to 314 and a switch 315.

The interfaces 311 to 314 are communication interfaces connected to an external communication apparatus of the transmission apparatus 300, and are connected to the switch 315. The interfaces 311 to 314 insert the OAM frame into the interval between packets to be transmitted.

The switch 315 is a switch that switches a path by switching connections among the interfaces 311 to 314, thereby enabling a packet input from any one of the interfaces 311 to 314 to be output from an arbitrary one of the interfaces 311 to 314 to the outside.

The synchronizer 320 adjusts the operation timing of the path switch 310. For example, the synchronizer 320 provides a synchronization signal (clock signal) indicating an identical timing to the interfaces 311 to 314 and the switch 315 that operates in synchronization with the synchronization signal output from the synchronizer 320 under control of the MCU 330.

The MCU 330 controls the operation of the path switch 310 such as the path switching by the switch 315 and the insertion of the OAM frame by the interfaces 311 to 314. The MCU 330 may be connected to a higher-level apparatus (operator) via a communication interface, and control the operation of the path switch 310 under control of the higher-level apparatus.

Figure 4:
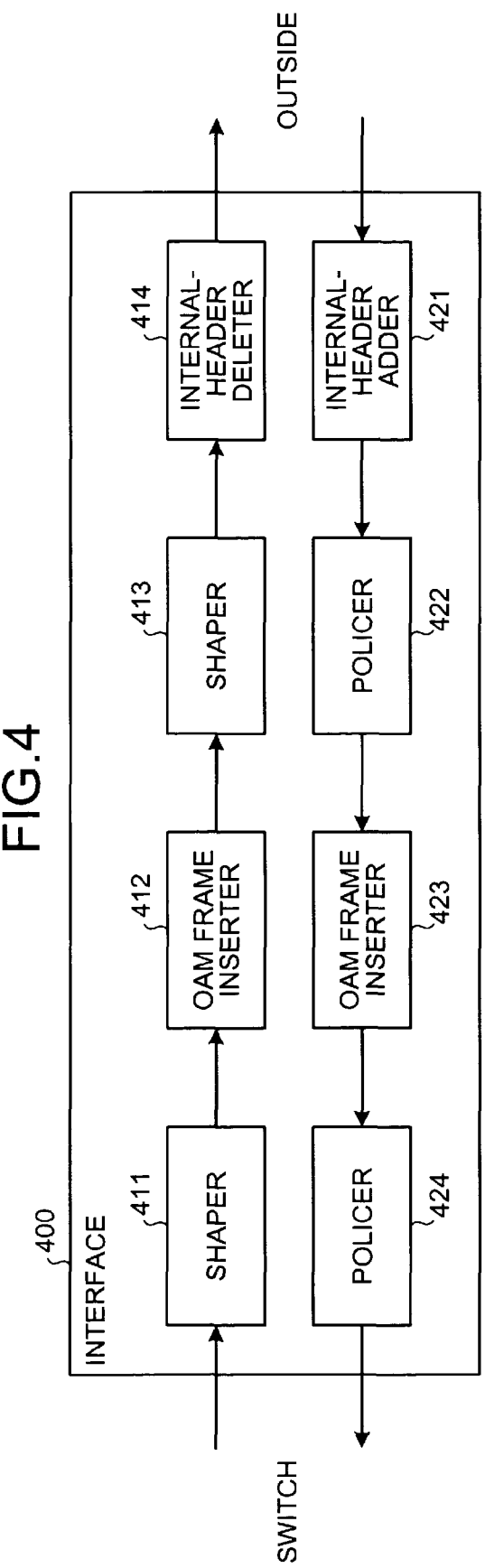
FIG. 4 is a schematic of an example of an interface.

FIG. 4 is a schematic of an example of an interface 400 that is an example of any one of the interfaces 311 to 314 depicted in FIG. 3. As depicted in FIG. 4, the interface 400 includes a shaper 411, an OAM frame inserter 412, a shaper 413, an internal-header deleter 414, an internal-header adder 421, a policer 422, and an OAM frame inserter 423, and a policer 424. Either of the shapers 411 and 413 may be omitted, and either of the policers 422 and 424 may be omitted.

The shaper 411 stores packets output from the switch 315, and outputs the stored packets to the OAM frame inserter 412 at a bandwidth smaller than a given bandwidth. The OAM frame inserter 412 inserts the OAM frame into the interval between the packets output from the shaper 411, and outputs the packets with the OAM frame being inserted therebetween to the shaper 413. The shaper 413 stores the packets output from the OAM frame inserter 412, and outputs the stored packets to the internal-header deleter 414 at a bandwidth smaller than a given bandwidth.

The internal-header deleter 414 deletes an internal header added to the packet output from the shaper 413. The internal header is added by another interface 400 when the packet is input into the transmission apparatus 100, and is used for the path switching by the switch 315. The internal-header deleter 414 transmits to an external communication apparatus connected to the interface 400, the packet from which the internal header has been deleted.

The internal-header adder 421 adds an internal header to a packet input from an external communication apparatus connected to the interface 400. For example, the internal-header adder 421 stores a table in which the destination indicated by the header of the input packet is associated with the internal header. The internal-header adder 421 acquires the internal header corresponding to the input header from the table, adds the acquired internal header to the packet, and outputs to the policer 422, the packet with the internal header being added.

The policer 422 outputs, from among the packets output from the internal-header adder 421, only packets within a given bandwidth to the OAM frame inserter 423 and discards other packets exceeding the given bandwidth. The OAM frame inserter 423 inserts the OAM frame into the interval between the packets output from the policer 422, and outputs the packets with the OAM frame being inserted therebetween to the policer 424. The policer 424 outputs, from among the packets output from the OAM frame inserter 423, only packets within a given bandwidth to the switch 315 and discards other packets exceeding the given bandwidth.

Figure 5:
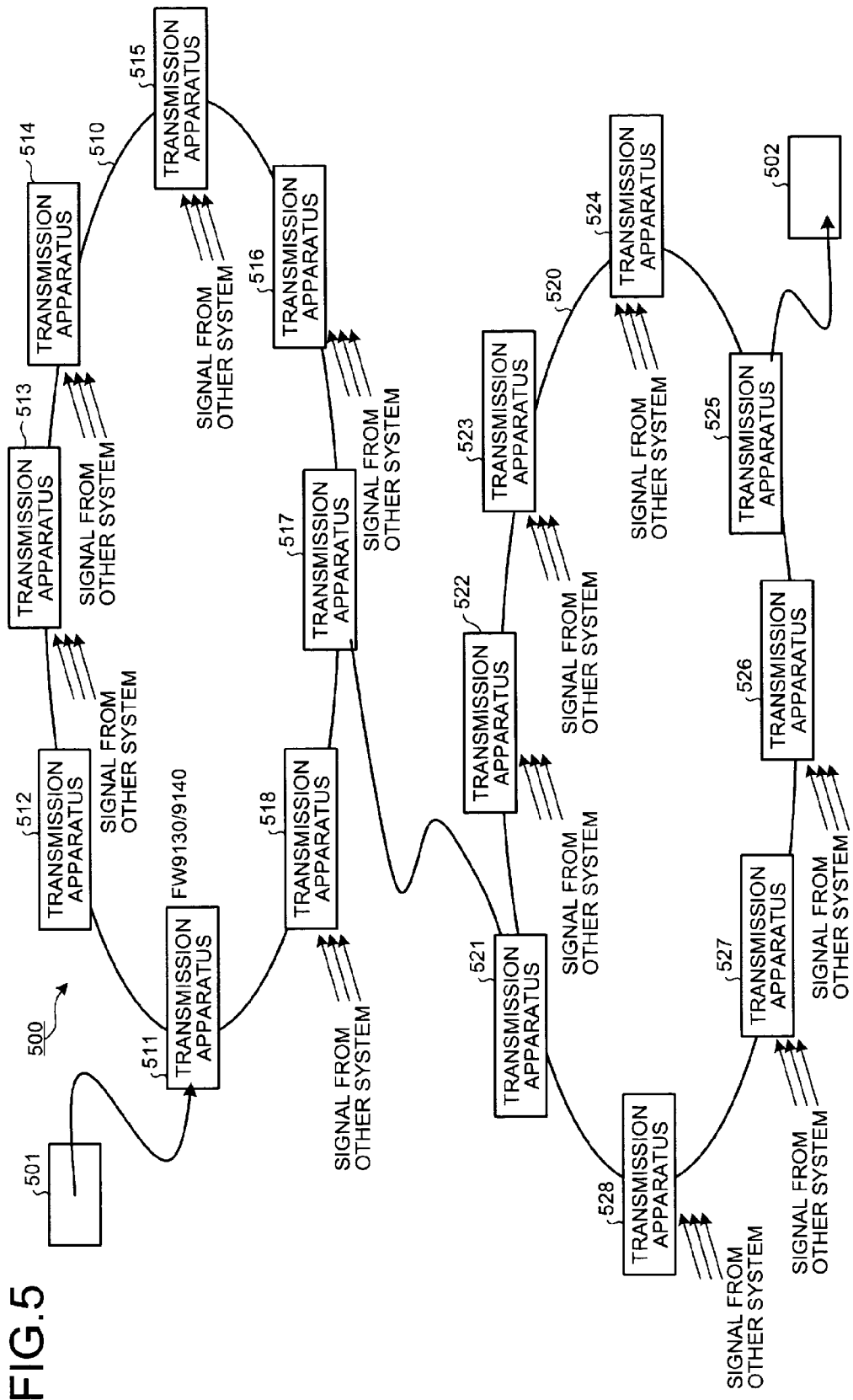
FIG. 5 is a schematic of an example of a transmission system that includes the transmission apparatus.

FIG. 5 is a schematic of an example of a transmission system that includes the transmission apparatus. A communication system 500 depicted in FIG. 5 is an example of a communication system that includes the transmission apparatus 100, and includes networks 510 and 520 each of which is a communication network where packets are transmitted at indefinite intervals such as Ethernet.

The network 510 includes transmission apparatuses 511 to 518 connected to form a ring. Each of the transmission apparatuses 511 to 518 exchanges signals with other transmission apparatuses in the network 510, and inserts signals from other systems into the network 510. The network 520 includes transmission apparatuses 521 to 528 connected to form a ring. Each of the transmission apparatuses 521 to 528 exchanges signals with other transmission apparatuses in the network 520, and inserts signals from other systems into the network 520.

The transmission apparatus 517 in the network 510 and the transmission apparatus 521 in the network 520 are connected with each other. A communication apparatus 501 is a communication apparatus at the subscriber side, and connected to the transmission apparatus 511 in the network 510. A communication apparatus 502 is a communication apparatus at the subscriber side, and connected to the transmission apparatus 525 in the network 520.

For example, the communication apparatus 501 transmits to the transmission apparatus 511, packets (for example, audio data) addressed to the communication apparatus 502. The packets are transmitted to the communication apparatus 502 via the networks 510 and 520. At least one of the transmission apparatuses 511 to 518 and 521 to 528 can be the transmission apparatus 100 depicted in FIG. 1.

Figure 6:
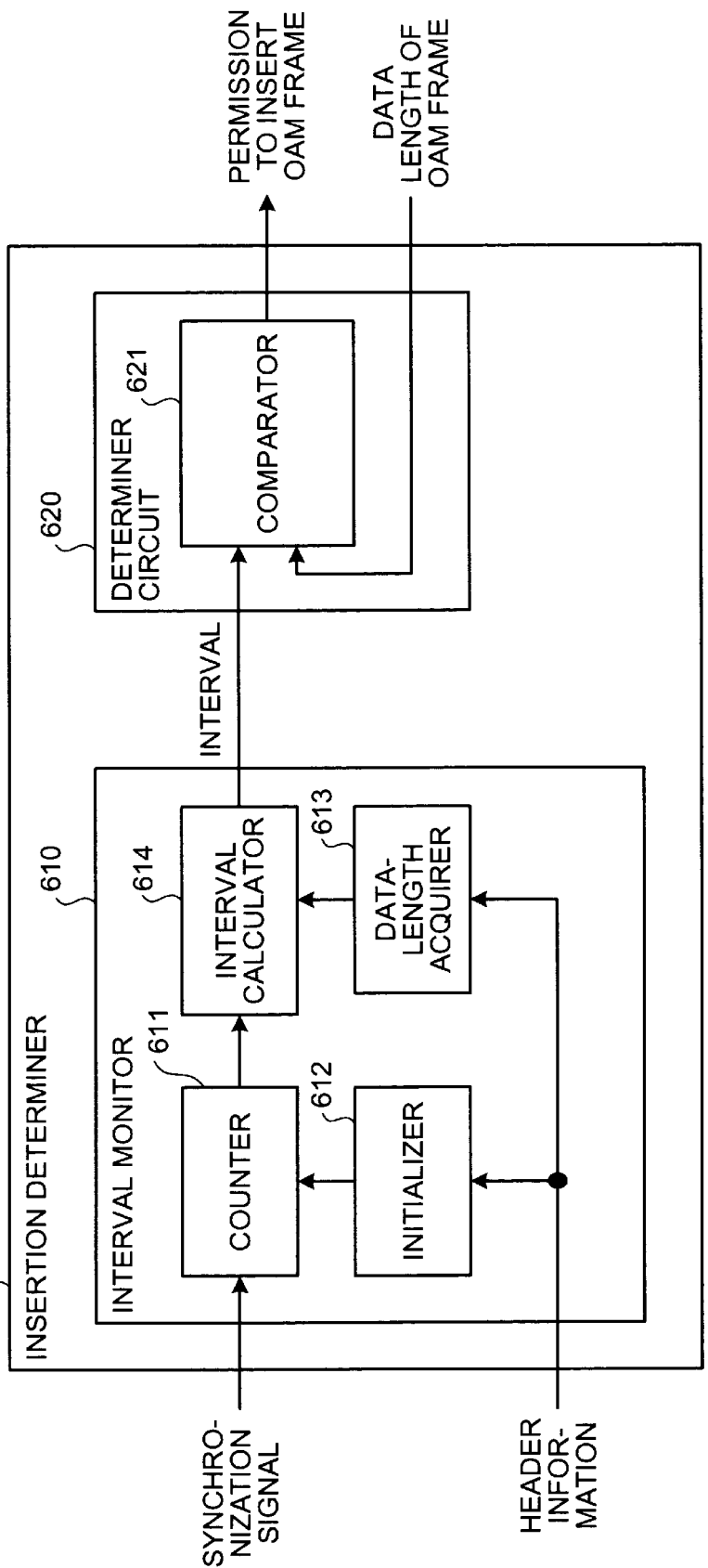
FIG. 6 is a schematic of an example of an insertion determiner.

FIG. 6 is a schematic of an example of the insertion determiner. As depicted in FIG. 6, the insertion determiner 203 depicted in FIG. 2 includes an interval monitor 610 (measuring circuit) and a determiner circuit 620. The interval monitor 610 monitors the interval between packets input into the OAM frame inserter 200, and includes a counter 611, an initializer 612, a data-length acquirer 613, and an interval calculator 614.

The counter 611 counts the synchronization signal input into the insertion determiner 203. For example, the counter 611 counts the rising edge of the synchronization signal. The value of the counter 611 increases at 1 GHz if the synchronization signal is, for example, a clock signal of 1 Gbps. The counter 611 outputs the value to the interval calculator 614.

The initializer 612 initializes the value of the counter 611 when the header information from the packet identifier 202 is input into the insertion determiner 203. In other words, the value of the counter 611 is initialized when the head of a packet is input into the OAM frame inserter 200. Thus, the value of the counter 611 indicates the time that has elapsed from the latest (so far) input of the head of the packet into the OAM frame inserter 200.

The data-length acquirer 613 acquires, from the header information output from the packet identifier 202, the data length (length information) of the packet input into the OAM frame inserter 200, and notifies the interval calculator 614 of the acquired data length.

Figure 7:
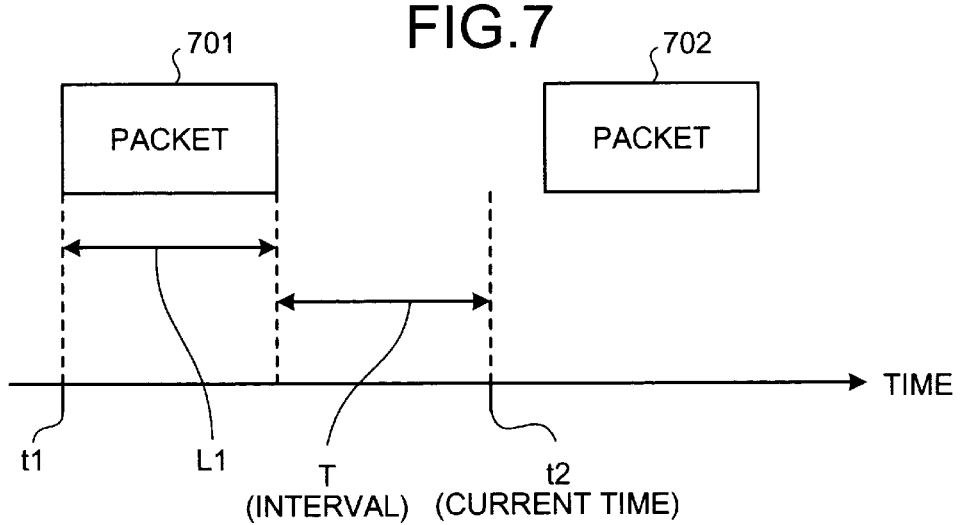
FIG. 7 is a schematic of an example of calculation of an interval.

The interval calculator 614 subtracts the data length notified by the data-length acquirer 613 from the value output from the counter 611 (the time that has elapsed from the input of the head of the packet), thereby calculating the time that has elapsed from the timing at which the tail of the latest (so far) packet is input into the OAM frame inserter 200 (see FIG. 7, for example). The interval calculator 614 notifies the determiner circuit 620 of the calculated time as the interval.

The determiner circuit 620 determines whether to insert the OAM frame based on the interval notified from the interval monitor 610 and the data length of the OAM frame notified from the OAM frame generator 201. For example, the determiner circuit 620 includes a comparator 621 that compares the interval notified from the interval monitor 610 and the data length of the OAM frame notified from the OAM frame generator 201.

The comparator 621 notifies the OAM frame generator 201 of permission to insert the OAM frame if the interval is equal to or longer than the data length of the OAM frame. The comparator 621 does not notify the OAM frame generator 201 of permission to insert the OAM frame if the interval is shorter than the data length of the OAM frame. This enables the permission to insert the OAM frame to be notified to the OAM frame generator 201 when there is a sufficient interval between the packets input into the OAM frame inserter 200.

The OAM frame inserter 200 can convert elapsed time and data length equivalently by processing input packets by 1 bit in synchronization with the synchronization signal (clock signal). Thus, the interval monitor 610 can calculate the interval between packets by calculating the time that has elapsed from the tail of the packet that is most recently input at the timing of clock trigger. The determiner circuit 620 can determine whether to insert the OAM frame by comparing the interval calculated by the interval monitor 610 and a time corresponding to the data length notified from the OAM frame generator 201.

Here, the OAM frame is inserted when the interval between packets is equal to or longer than the data length of the OAM frame. However, the condition to insert the OAM frame is not limited to this. For example, even when the interval between packets is shorter than the data length of the OAM frame, the OAM frame may be inserted if the difference between the interval between packets and the data length of the OAM frame is equal to or smaller than a threshold.

For example, even when the interval between packets is shorter than the data length of the OAM frame, the OAM frame may be inserted if the variation in transmission delay of the packet due to the insertion of the OAM frame (for example, audio fluctuation) is small and ignorable. Thus, the determiner circuit 620 compares the data length of the OAM frame and the interval, and determines whether to insert the OAM frame based on the result of the comparison.

FIG. 7 is a schematic of an example of calculation of the interval. Packets 701 and 702 are packets input into the OAM frame inserter 200. The packet 702 is a packet subsequent the packet 701. t1 is the time at which the head of the packet 701 is input into the OAM frame inserter 200. t2 is the current time. L1 indicates the data length of the packet 701. Here, the current time t2 is a time after the tail of the packet 701 is input and before the head of the packet 702 is input.

The value output from the counter 611 to the interval calculator 614 indicates the time that has elapsed since the time t1 at which the head of the packet 701 is input until the current time t2. The data length notified from the data-length acquirer 613 to the interval calculator 614 indicates the data length L1. Thus, the interval calculator 614 subtracts the data length L1 from the time that has elapsed since the time t1 until the current time t2, thereby calculating the interval T from the time at which the tail of the packet 701 is input until the current time.

Thus, the insertion determiner 203 can measure, as the interval, the time that has elapsed since the tail of the packet was input into the packet identifier 202. The insertion determiner 203 can measure the interval based on the timing at which the header of the packet is input into the packet identifier 202 and the information included in the header and indicating the data length of the packet.

Figure 8:
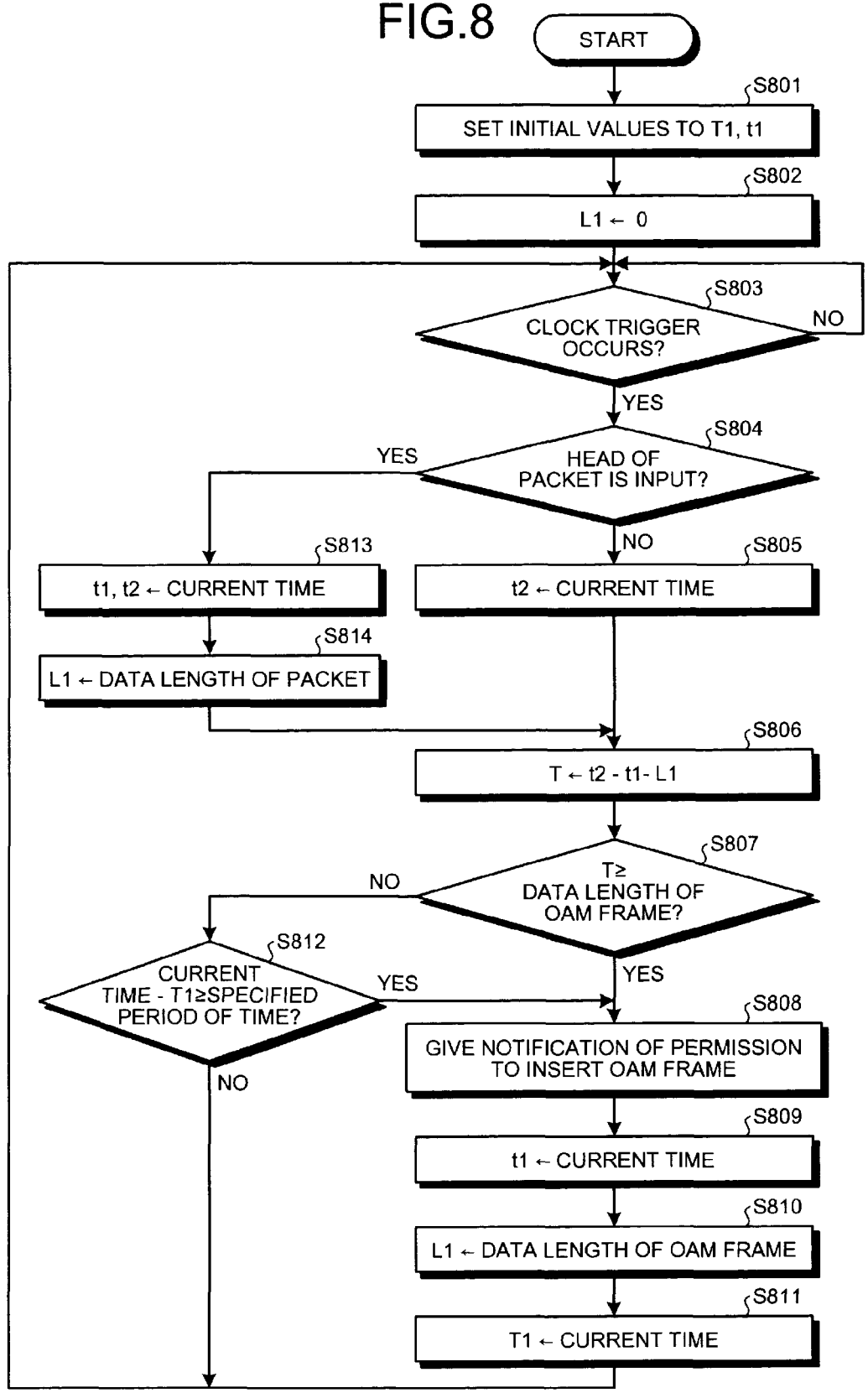
FIG. 8 is a flowchart of an example of operation of the insertion determiner.

FIG. 8 is a flowchart of an example of the operation of the insertion determiner. The insertion determiner 203 executes steps depicted in FIG. 8, for example. In FIG. 8, T1 represents a variable indicating the time of the latest (so far) insertion of the OAM frame. t1 represents a variable indicating the time of the latest (so far) input of a packet or the latest (so far) insertion of the OAM frame. t2 represents a variable indicating the current time (the time of the latest clock trigger). T represents a variable indicating the interval from the timing at which the tail of the latest (so far) packet is input up to the present.

L1 represents a variable indicating the data length of the packet or the OAM frame. L1 stores the data length of the input packet if the input of the packet occurred last (so far) among the inputs of the packets and the insertion of the OAM frames. L1 stores the data length of the inserted OAM frame if the insertion of the OAM frame occurred last (so far) among the inputs of the packets and the insertion of the OAM frames.

The insertion determiner 203 sets given initial values to T1 and t1 (step S801), and sets 0 to L1 (step S802). The insertion determiner 203 determines whether a clock trigger based on the synchronization signal input into the OAM frame inserter 200 occurs (step S803), and if not, waits for the clock trigger (step S803: NO).

If a clock trigger occurs (step S803: YES), the insertion determiner 203 determines whether the head of a packet has been input (step S804), and if not (step S804: NO), sets the current time to t2 (step S805).

The insertion determiner 203 calculates "t2−t1−L1," and sets the result of the calculation to T (step S806). The insertion determiner 203 determines whether the value of T (interval) is equal to or longer than the data length of the OAM frame notified from the OAM frame generator 201 (step S807), and if so (step S807: YES), that is, if there is a sufficient interval into which the OAM frame is to be inserted, the insertion determiner 203 notifies the OAM frame generator 201 of permission to insert the OAM frame (step S808).

The insertion determiner 203 sets the current time to t1 (step S809), sets the data length of the OAM frame notified from the OAM frame generator 201 to L1 (step S810), sets the current time to T1 (step S811), and executes step S803.

If the value of T is shorter than the data length of the OAM frame (step S807: NO), that is, if there is no sufficient interval into which the OAM frame is to be inserted, the insertion determiner 203 calculates "the current time−T1," and determines whether the result of the calculation is at least a given specified period of time (step S812), that is, whether the time that has elapsed from the latest (so far) insertion of the OAM frame is at least the given specified period of time.

If the result of the calculation is equal to or longer than the given specified time (step S812: YES), the insertion determiner 203 executes step S808. Thus, the OAM frame can be forcibly inserted if no OAM frame has been inserted for the specified period of time or longer, even when there is no sufficient interval into which the OAM frame is to be inserted.

If the result of the calculation is shorter than the given specified period of time (step S812: NO), the insertion determiner 203 executes step S803. If the head of a packet has been input (step S804: YES), the insertion determiner 203 sets the current time to t1 and t2 (step S813), sets the data length of the packet input at step S804 to L1 (step S814), and executes step S806.

By executing the steps described above, the insertion determiner 203 can notify the OAM frame generator 201 of permission to insert the OAM frame if the interval between packets input into the OAM frame inserter 200 is equal to or longer than the data length of the OAM frame. Nevertheless, the insertion determiner 203 determines to insert the OAM frame if no OAM frame has been inserted for a given specified period of time (given time) or longer, thereby preventing failure of the OAM function due to no insertion of the OAM frame for a long time.

Figure 9:
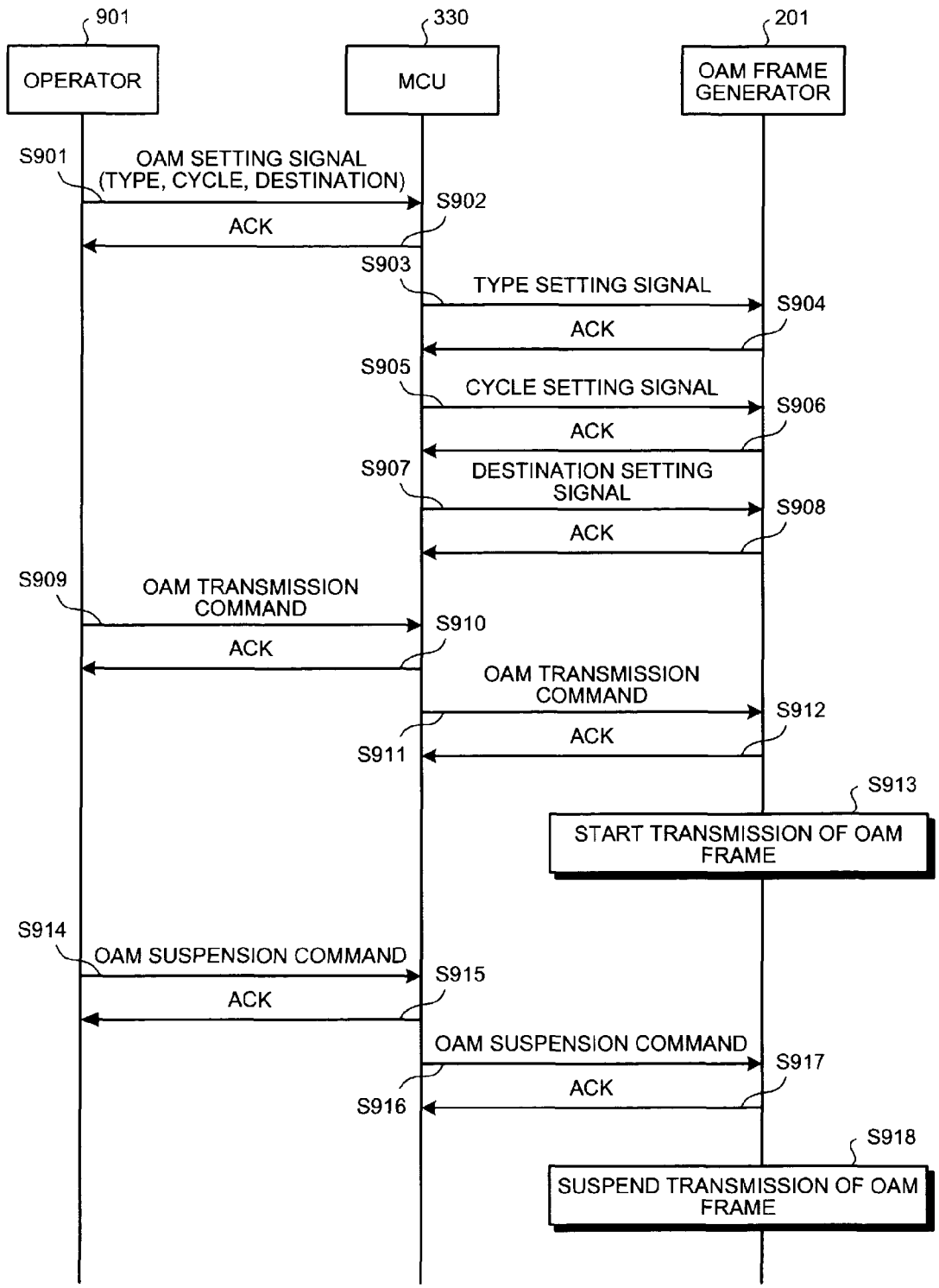
FIG. 9 is a sequence diagram of an example of generation of an OAM frame by an OAM frame generator.

FIG. 9 is a sequence diagram of an example of generation of OAM frame by the OAM frame generator. An operator 901 depicted in FIG. 9 is, for example, an apparatus operated by a manager of the transmission apparatus 100, and exchanges signals with the MCU 330 of the transmission apparatus 100 via a communication interface.

The operator 901 transmits to the MCU 330 of the transmission apparatus 100, an OAM setting signal instructing to set up OAM (step S901). The OAM setting signal includes, for example, information such as the type of OAM, the cycle of transmission of the OAM frame, and the destination of the OAM frame. The MCU 330 transmits to the operator 901, an ACK (response signal) in response to the OAM setting signal transmitted at step S901 (step S902).

The MCU 330 outputs a type setting signal instructing to set the type of OAM to the OAM frame generator 201, based on the OAM setting signal transmitted at step S901 (step S903). The OAM frame generator 201 outputs to the MCU 330, an ACK in response to the type setting signal output at step S903 (step S904).

The MCU 330 outputs to the OAM frame generator 201, a cycle setting signal instructing to set the cycle of transmission of the OAM frame, based on the OAM setting signal transmitted at step S901 (step S905). The OAM frame generator 201 outputs to the MCU 330, an ACK in response to the cycle setting signal output at step S905 (step S906).

The MCU 330 outputs to the OAM frame generator 201, a destination setting signal instructing to set the destination of the OAM frame, based on the OAM setting signal transmitted at step S901 (step S907). The OAM frame generator 201 outputs to the MCU 330, an ACK in response to the destination setting signal output at step S907 (step S908).

The operator 901 transmits to the MCU 330, an OAM transmission command instructing to start transmission of the OAM frame (step S909). The MCU 330 transmits to the operator 901, an ACK in response to the OAM transmission command transmitted at step S905 (step S910). The MCU 330 outputs to the OAM frame generator 201, the OAM transmission command transmitted at step S905 (step S911). The OAM frame generator 201 outputs to the MCU 330, an ACK in response to the OAM transmission command output at step S911 (step S912).

The OAM frame generator 201 starts to transmit the OAM frame (step S913). For example, the OAM frame generator 201 generates an OAM frame of the type indicated by the type setting signal transmitted at step S903 and having the destination indicated by the destination setting signal transmitted at step S907, and notifies the insertion determiner 203 of the data length of the generated OAM frame.

The OAM frame generator 201 transmits, if notified by the insertion determiner 203 of the permission to insert the OAM frame, the OAM frame by outputting the generated OAM frame to the inserter 205. The OAM frame generator 201 also notifies the insertion determiner 203 of the data length of the OAM frame at the cycle indicated by the cycle setting signal output at step S905. For example, the OAM frame generator 201 may decide the specified period of time used at step S812 of FIG. 8 based on the cycle setting signal output at step S905, and set the decided specified period of time to the insertion determiner 203.

If the operator 901 transmits to the MCU 330, an OAM suspension command instructing to suspend transmission of the OAM frame (step S914), the MCU 330 transmits to the operator 901, an ACK in response to the OAM suspension command transmitted at step S914 (step S915).

The MCU 330 outputs to the OAM frame generator 201, the OAM suspension command transmitted at step S914 (step S916). The OAM frame generator 201 outputs to the MCU 330, an ACK in response to the OAM transmission command output at step S916 (step S917), and suspends the transmission of the OAM frame (step S918), thereby ending the sequence of operations.

Figure 10:
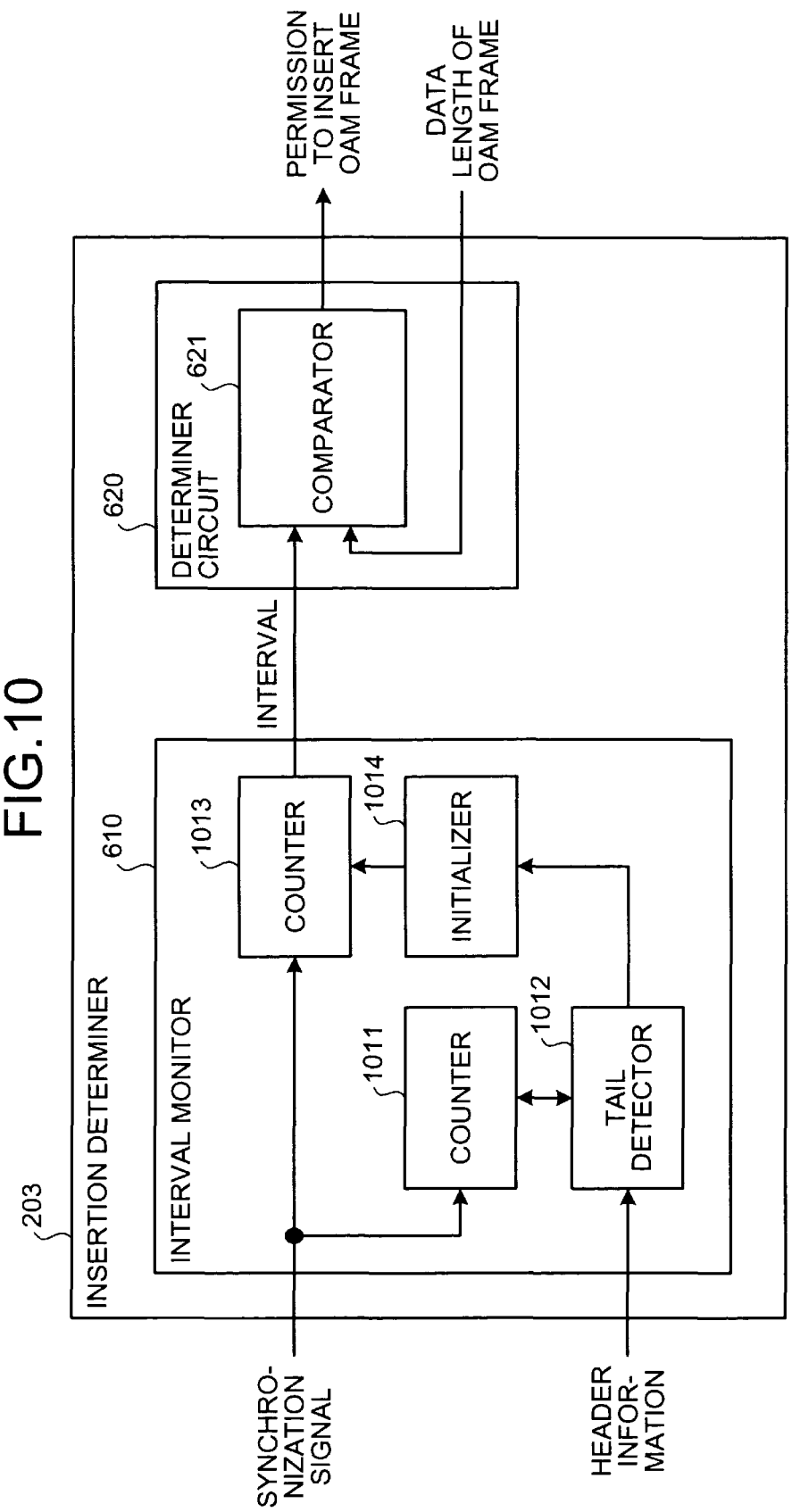
FIG. 10 is a schematic of a modification of the insertion determiner.

FIG. 10 is a schematic of a modification of the insertion determiner. In FIG. 10, elements similar to those depicted in FIG. 6 are assigned the same signs used in FIG. 6, and description thereof is omitted. As depicted in FIG. 10, the interval monitor 610 of the insertion determiner 203 may include a counter 1011, a tail detector 1012, a counter 1013, and an initializer 1014. Similar to the counter 611 depicted in FIG. 6, each of the counters 1011 and 1013 counts the synchronization signal input into the insertion determiner 203. The counter 1011 outputs the value thereof to the tail detector 1012, and the counter 1013 outputs the value thereof to the determiner circuit 620.

The tail detector 1012 detects the timing of the tail of a packet input into the OAM frame inserter 200 based on the header information input into the insertion determiner 203. For example, the tail detector 1012 initializes the counter 1011 when the header information is input into the insertion determiner 203, and detects, as the timing of the tail of the packet, the timing at which the value of the counter 1011 reaches a value corresponding to the data length of the packet included in the header information. The tail detector 1012 outputs a tail detection signal to the initializer 1014 upon detecting the timing of the tail of the packet.

The initializer 1014 initializes the value of the counter 1013 when the tail detection signal is output from the tail detector 1012. In other words, the value of the counter 1013 is initialized when the tail of a packet is input into the OAM frame inserter 200. Thus, the value of the counter 1013 indicates the time that has elapsed since the latest (so far) input of the tail of the packet into the OAM frame inserter 200.

Thus, the interval monitor 610 of the insertion determiner 203 may measure the interval between packets by detecting the input timing of the tail of the packet and counting the time that has elapsed since the input timing of the tail of the packet by the counter 1013.

Figure 11:
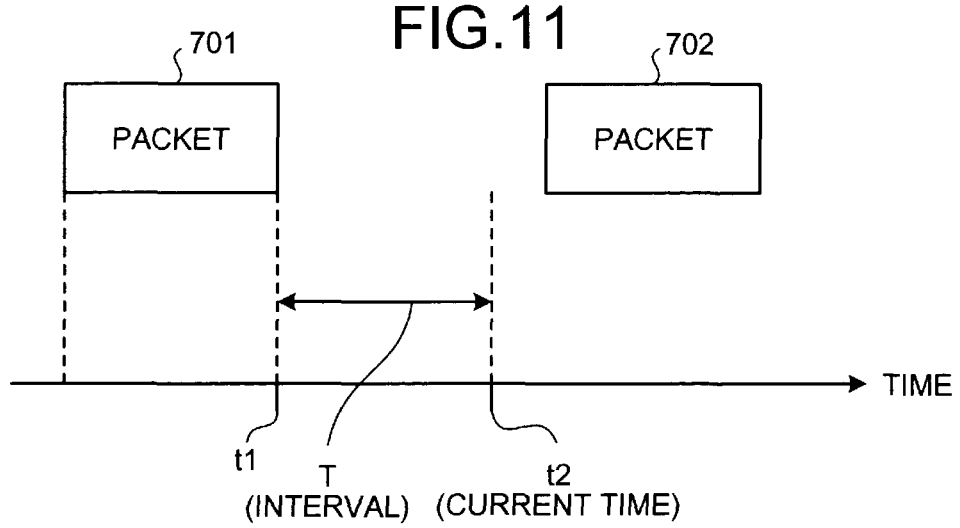
FIG. 11 is a schematic of an example of calculation of interval according to the modification.

FIG. 11 is a schematic of an example of calculation of the interval according to the modification. In FIG. 11, elements similar to those depicted in FIG. 7 are assigned the same signs used in FIG. 7, and description thereof is omitted. t1 represents the time at which the tail of the packet 701 is input into the OAM frame inserter 200. t2 represents the current time. The value of the counter 1013 is initialized at the time t1, the time at which the tail of the packet 701 is input. Thus, the value output from the counter 1013 to the interval monitor 610 indicates the interval T from the input of the tail of the packet 701 up to the present.

Figure 12:
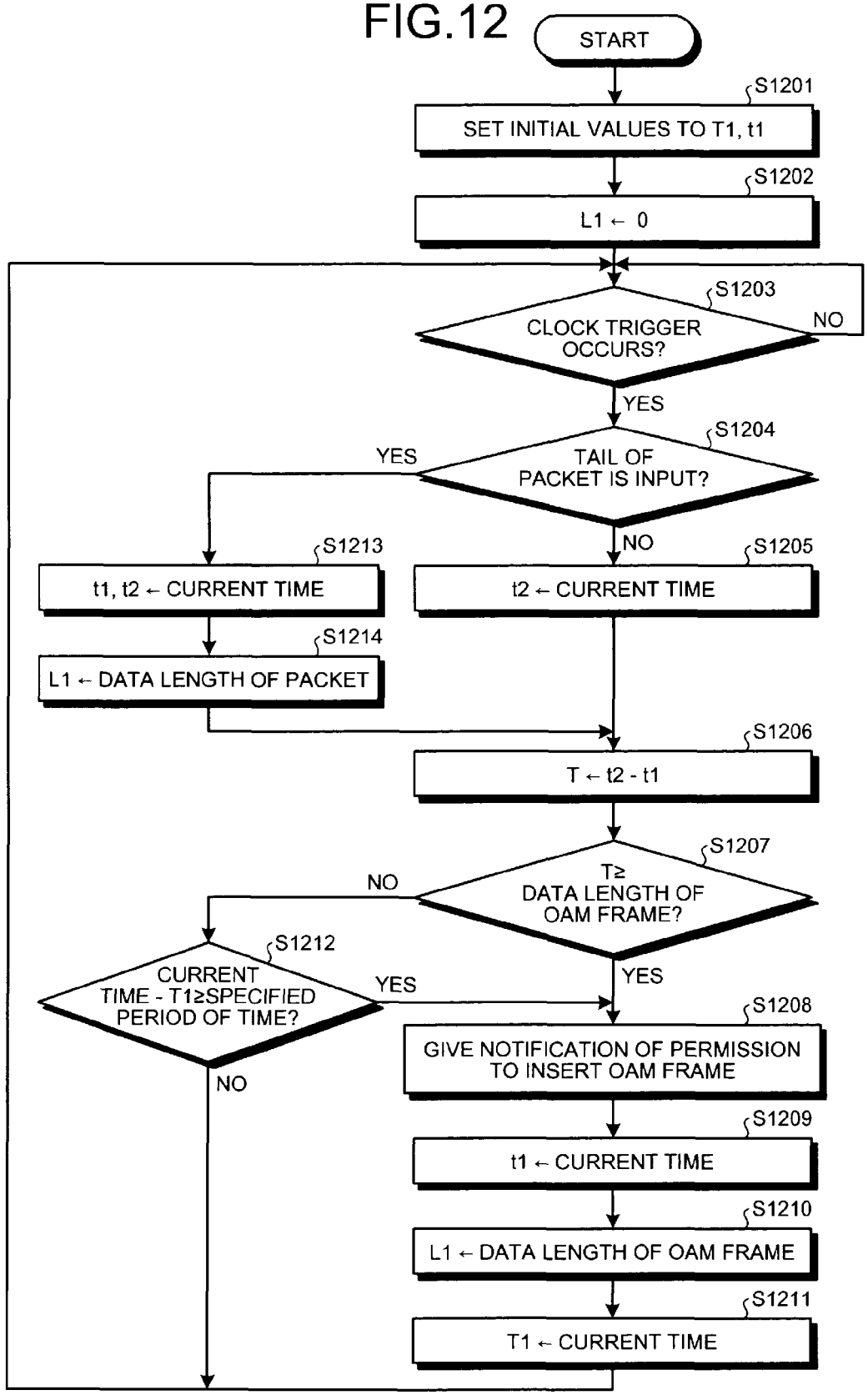
FIG. 12 is a flowchart of an example of operation of the insertion determiner according to the modification.

FIG. 12 is a flowchart of an example of the operation of the insertion determiner according to the modification. The insertion determiner 203 may execute steps depicted in FIG. 12, for example. Description of elements that are depicted in FIG. 12 and are similar to those depicted in FIG. 8 is omitted. In FIG. 12, t1 represents a variable indicating the time at which the tail of the latest (so far) packet is input.

Steps S1201 to S1203 are similar to steps S801 to S803 depicted in FIG. 8. If a clock trigger occurs (step S1203: YES), the insertion determiner 203 determines whether the tail of a packet has been input (step S1204) based on, for example, the timing at which the header of the packet is input and L1 (see FIG. 10, for example).

If the tail of the packet has not been not input (step S1204: NO), the insertion determiner 203 sets the current time to t2 (step S1205), and calculates "t2−t1" and sets the result of the calculation to T (step S1206). Steps S1207 to S1214 are similar to steps S807 to S814 depicted in FIG. 8.

Figure 13:
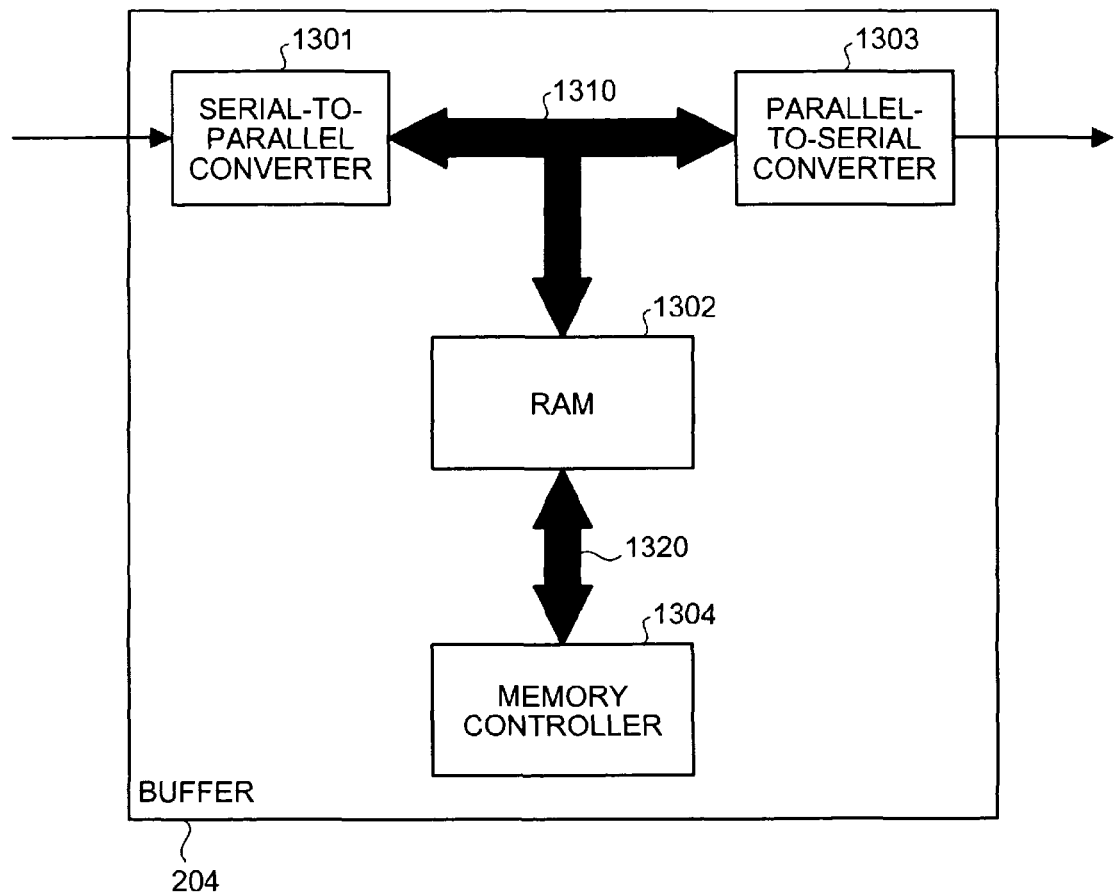
FIG. 13 is a schematic of a modification of a buffer.

FIG. 13 is a schematic of a modification of the buffer. As depicted in FIG. 13, the buffer 204 depicted in FIG. 2 may include a serial-to-parallel converter 1301, a random access memory (RAM) 1302, a parallel-to-serial converter 1303, a memory controller 1304, a data bus 1310, and an address bus 1320.

The serial-to-parallel converter 1301 converts serial packets output from the packet identifier 202 (see FIG. 2) into parallel data, and outputs the converted data to the RAM 1302 via the data bus 1310.

Under control of the memory controller 1304, the RAM 1302 stores the data output from the serial-to-parallel converter 1301 (write), and outputs the stored data to the parallel-to-serial converter 1303 via the data bus 1310 (read).

The parallel-to-serial converter 1303 converts the parallel data output from the RAM 1302 into serial packets, and outputs the converted serial packets to the inserter 205 (see FIG. 2). The memory controller 1304 controls write/read of data to/from the RAM 1302 via the address bus 1320.

Figure 14:
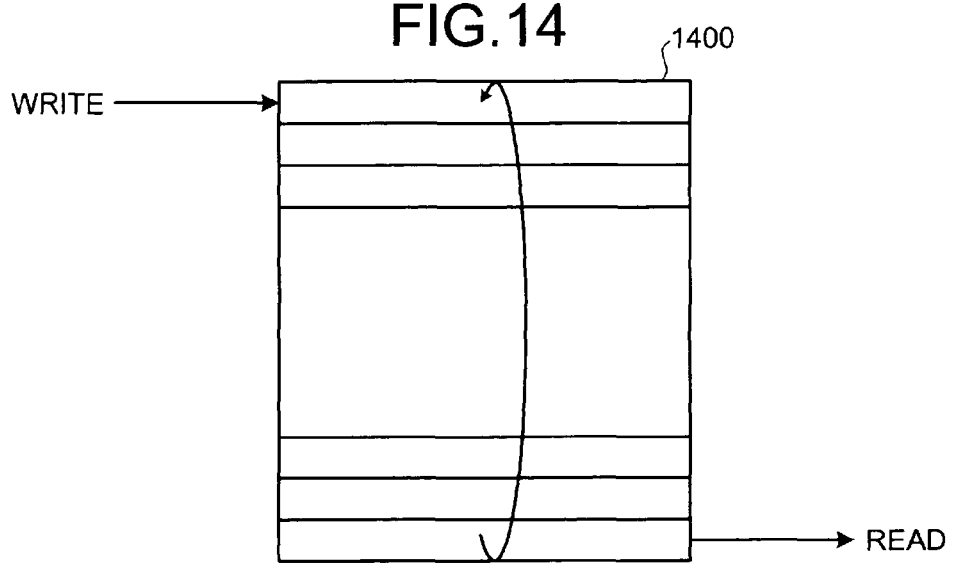
FIG. 14 is a schematic of an example of control by a memory controller.

FIG. 14 is a schematic of an example of control by the memory controller. A storage area 1400 depicted in FIG. 14 is an example of a storage area of the RAM 1302 depicted in FIG. 13. The memory controller 1304 uses the RAM 1302 as a ring buffer by controlling the write address and the read address with respect to the storage area 1400. Thus, similar to the flip-flop circuits #1 to #n depicted in FIG. 2, the buffer 204 depicted in FIG. 13 can temporarily store the packet and sequentially output the stored packet.

As described above, according to the transmission apparatus and the transmission method, the variation in transmission delay of the packet can be suppressed by measuring the interval between packets and inserting the OAM frame if there is a sufficient interval. Thus, audio fluctuation due to the insertion of OAM frames can be suppressed even in a communication network where no null packet is transmitted such as Ethernet.

Here, an OAM frame is inserted between input packets. However, the given frame to be inserted between the input packets is not limited to the OAM frame. For example, the given frame can be a frame that needs not to be transmitted in real time unlike the packets of audio data input into the transmission apparatus 100.

According to an aspect of the present invention, variation in transmission delay can be suppressed.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A transmission apparatus, comprising:
a digital circuit that includes:
an input circuit into which packets are input at indefinite intervals;
a measuring circuit that measures an interval during which no packet is input into the input circuit;
a determiner circuit that determines, based on the interval measured by the measuring circuit, whether to insert a frame between the packets input into the input circuit; and
a transmitter that inserts, based on a result of determination by the determiner circuit, the frame between the packets input into the input circuit and sequentially transmits the packets with the frame therebetween, and
wherein the determiner circuit determines to insert the frame after a period of time has elapsed from a latest insertion of the frame by the transmitter even when the measured interval is shorter than a data length of the frame,
wherein the measuring circuit measures, as the interval, a time that elapses since a tail of a packet is input into the input circuit, and
wherein the measuring circuit measures the time based on a timing at which a header of the packet is input into the input circuit and information indicating the data length of the packet included in the header.

2. The transmission apparatus according to claim 1, wherein the determiner circuit determines whether to insert the frame based on a comparison of the data length of the frame and the interval measured.

3. The transmission apparatus according to claim 1, wherein the frame is an operation administration maintenance (OAM) frame.

4. A transmission method, comprising:
inputting packets at indefinite intervals;
measuring an interval during which no packet is input;
determining, based on the interval measured, whether to insert a frame between the input packets;
inserting, based on a result of determining, the frame between the input packets, and sequentially transmitting the input packets with the frame therebetween,
wherein the determining judges to insert the frame after a period of time has elapsed from a latest insertion of the frame resulting from the inserting even when the measured interval is shorter than a data length of the frame,
wherein the measuring measures, as the interval, a time that elapses since a tail of a packet is input, and wherein the measuring measures the time based on a timing at which a header of the packet is input and information indicating the data length of the packet included in the header.

5. A method, comprising:

measuring an interval of time between packets input at indefinite intervals where no packet data is input;

determining whether to insert a frame between the packets input based on a comparison of a length of the frame to a length of the interval measured; and inserting the frame between the packets input in response to the comparison indicating that the interval measured is equal to or longer than the length of the frame, wherein the frame is inserted after a period of time has elapsed from a latest insertion of the frame even when the measured interval is shorter than the length of the frame, wherein the measuring measures, as the interval, a time that elapses since a tail of a packet is input, and wherein the measuring measures the time based on a timing at which a header of the packet is input into the input circuit and information indicating the data length of the packet included in the header.

* * * * *